United States Patent [19]

Bellamy

[11] Patent Number: 4,782,663
[45] Date of Patent: Nov. 8, 1988

[54] PNEUMATIC HYDRO-ELECTRIC POWER CONVERSION SYSTEM

[75] Inventor: Norman W. Bellamy, Coventry, England

[73] Assignee: Hydro Energy Associates Limited, England

[21] Appl. No.: 852,230

[22] Filed: Apr. 15, 1986

[30] Foreign Application Priority Data

Apr. 16, 1985 [GB] United Kingdom ............... 8509671
Jun. 26, 1985 [GB] United Kingdom ............... 8516148

[51] Int. Cl.[4] ............................................. F16D 31/02
[52] U.S. Cl. ......................................... 60/398; 60/502; 290/53
[58] Field of Search ................... 290/53, 54; 60/398, 60/495, 502; 417/334

[56] References Cited

U.S. PATENT DOCUMENTS

| | | | |
|---|---|---|---|
| 3,353,787 | 11/1967 | Semo | 253/4 |
| 4,095,423 | 6/1978 | Gorlov | 60/398 |
| 4,164,383 | 8/1979 | French | 60/398 X |
| 4,448,020 | 5/1984 | Wood et al. | 60/398 |

FOREIGN PATENT DOCUMENTS

| | | |
|---|---|---|
| 2061395 | 10/1979 | United Kingdom . |
| 2082687 | 8/1980 | United Kingdom . |
| 2093922 | 3/1981 | United Kingdom . |
| 2100810 | 6/1983 | United Kingdom . |
| 2143284 | 2/1985 | United Kingdom . |

Primary Examiner—William E. Wayner
Attorney, Agent, or Firm—Klauber & Jackson

[57] ABSTRACT

The invention provides for the generation of electrical power from low head water, such as the flowing water of rivers or the like, the electrical power is generated by passing the water in sequence over flexible bags or membranes to displace air under the flexible bags or membranes. The displacement of the air is utilized for the driving of a power generator such as an air turbine, and smooth power flow is achieved by diverting air displaced from the underside of one membrane into the cavity under the other membrane. The water flows over the membranes in sequence so that a self oscillating system is set up with the air being displaced back and forth from the cavities, and the displacement air being used to drive the air turbine. Preferably a bi-directional air turbine such as a Wells turbine is used.

18 Claims, 8 Drawing Sheets

FIG.2A. VALVE OPEN

FIG.2B. VALVE CLOSED

FIG.2C. VALVE OPEN

FIG.2D. VALVE CLOSED

FORWARD MODE  FIG. 3D

PNEUMATIC HYDRO-ELECTRIC POWER CONVERSION SYSTEM

This invention relates to hydro electric power systems, and in particular concerns a pneumatic conversion system for converting the energy, especially but not exclusively head energy in liquids to a more readily useable form, for example electrical energy. The invention has particular utility for low water head applications such as on rivers, and possibly tidal sites. By low head as used in this specification is meant water head from 1 m to 10 m, the systems being adapted to produce power capacities in the range 100 kw to 10 mw. Although the system of the invention has particular and best application to these low water head applications, it is not suggested that the inventive system could not be used for higher or lower head or capacities applications, and indeed it can be used for converting kinetic energy in liquids.

When one considers the conventional installations which are utilised for the production of electrical power, one immediately identifies power stations which use a fossil fuel, and hydro-electric installations utilising heads of water to drive water turbines. The system of the present invention is best compared with the hydro-electric power stations in that the head or kinetic energy in water or the like is converted into energy in a readily useable form, but the system of the present invention can be compared with both of the abovementioned conventional systems in providing for the production of electrical power at a lower unit cost than the hydro-electric power stations and fossil fuel fired power stations.

Low head hydro-electric power was in fact used extensively from the end of the last century, and the flow of many European rivers was controlled by weirs or barrages to provide the necessary water head. The majority of the river structures remain but are unused as power sources, because of the poor economics involved in converting the water heads of such structures into electrical energy using conventional water turbines. This is due to the fact that it is expensive to convert low head water energy by means of large diameter, slow speed water turbines. These redundant structures are now creating more interest in that the cost of electricity generation has escalated sharply in recent times.

For example, for developing countries hydro-electric power appears to be the most economically attractive for providing the country's electrical power, but in many cases the huge capital costs and absence of electrical distribution means, leads to the result that the adoption of conventional hydro-electric power stations is not possible within developing country economies. A large number of schemes operating on a small head however provide an alternative and more economical source of electrical power.

In the United Kingdom, recent legislation has enabled private organisations to generate and sell electricity to the Central Electricity Generating Board and frequently it will be attractive to such organisations because of the proximity to a suitable water site, to deploy a low head energy conversion system for producing electrical power from the available water head. In the United Kingdom, there are many suitable sites, such as old mill sites which could be used for the generation of small power outputs suitable for supplying the national grid or the needs of the owner of the site, and perhaps a number of surrounding users.

It is believed that the potential for low head hydro-electric power is in fact likely to be considerable in the not too distant future.

There have recently been proposed at least two systems for the conversion of low head water energy to another form suitable for providing electrical energy, and the first scheme is set out in British patent application No. 2096706A, which discloses a water engine comprising a plurality of vanes arranged as a barrage. The water by its head and/or kinetic energy acting on one side of the barrage causes a reaction on the vanes moving the vanes in the direction of the barrage until an extreme position is reached when the vanes change inclination and the water reaction causes the vanes to move in the opposite direction. This mechanical reciprocation of the vanes is utilised for providing electrical energy. It is believed that the mechanical complexities of this device will cause problems in operation.

Another low head system which has been proposed is disclosed in a paper presented by Coventry Lanchester Polytechnic September 1984, authors Peatfield, Duckers, Lockett, Loughridge, White and West and as published in U.K. Patent Specification No. 2143284 which comprises an enclosed chamber into which available water flow can be controlled by the operation of inlet and outlet valves in such a way that the effective driving pressures for both the filling and emptying cycles can be a large portion of the head available at the site chosen. The operational cycle commences with the opening of the water inlet valve, allowing water into the empty chamber with the outlet valve closed, filling the chamber with water and driving the air out under pressure through a turbine known as a Wells turbine, which is of a bi-directional drive type in that the propelling fluid can be passed through the blades in either direction and will drive the turbine in the same direction as compared to the uni-directional conventional turbine which requires the fluid to pass through the blades in one direction only. At a suitable point near the end of the filling cycle the inlet valve is closed and the outlet valve is then opened allowing exit of the water to the downstream of the side of the water retaining structure. This emptying process causes air to be sucked back into the chamber through the still rotating Wells turbine which is thus used to extract energy at the optimum rate during both parts of the cycle. Then at a suitable point near the bottom of the emptying cycle, the outlet valve is closed and the whole cycle recommences with the re-opening of the inlet valve.

This system is viewed as having problems concerning the opening and closing of the inlet and outlet valves which must operate once per 10 seconds, and such high frequency long term operation could lead to operating difficulties.

The present invention bears certain similarities to the system outlined in the said Coventry Lanchester Polytechnic paper in that the water is used to displace air, and the displaced air is used for the driving of an apparatus such as in one example a Wells turbine. Although air will be the medium which will be used in the majority of practical cases, it is to be pointed out that any gaseous or vapour medium having the appropriate characteristics, which will become clear from an explanation of the invention, can be used. Equally whilst water is the liquid which will be most used for the present invention, again one can replace the water with another and different liquid. The expression water and air should therefore be construed accordingly in the following.

To achieve respectable power outputs from low head hydro-electric systems, the energy contained in large flows of low pressure water has to be extracted. In the invention the water power is converted to air power and, for example, high speed air turbo-generators produce the electrical power. The water to air power convertor in fact acts as a gear box eliminating the need for large expensive water turbines. The air turbo-generator is a relatively low cost item and can be located at any convenient point above water levels.

The present invention involves the use of flexible membrane means, made for example of a reinforced rubber material, to act as a robust water to air interface capable of efficient power transfer, and the invention is based upon the realisation that power or energy transfer through a membrane with water on one side and air on the other side can be chosen to suit a variety of applications depending upon whether or not the membrane is vertical with the air on one side and the water on the other side, or the air is to the top side of the membrane whilst the water is to the underside, or vice versa, because in the latter case i.e. when the water is above the membrane, and the air is to the underside, the power transfer characteristic is similar to that of a spring having a negative spring rate, which means in fact that if the air to the underside of the membrane is pressurised so as to deflect the membrane upwards, over a range of operation, the force required to deflect the membrane decreases with increasing upwards deflection. This in fact represents what might be considered to be an unstable condition of a type suitable for generating oscillation, and the present invention recognises this characteristic and provides that air flows between two air chambers at least partially defined by flexible membrane means which are subjected to water pressure in sequence, the water pressure acting so as to have at least a gravitational component tending to collapse the chambers in turn so that with collapse of one chamber air is displaced therefrom into the other chamber in order to displace water thereabove, and the flow of air between chambers can be utilised to drive for example turbine.

In a simple and effective arrangement, a closed passage through which liquid forming the low head source flows contains a flexible membrane means in the form of bags defining two independent cavities and over which the water flowing down the passage passes in turn. As the down flowing water passes over the first it collapses same and drives the air therefrom into the second bag and as the air so travels, it drives a Wells turbine located in a passage coupling the two cavities. As the water flows over the second bag, it collapses same returning the air through said passage from the second bag to the first bag to re-inflate same with the "negative spring" characteristic described above, and the reverse flow of air through the said coupling passage continues to drive the turbine whereby continuous electrical energy results.

It will be appreciated that at the start up condition one of the bags is collapsed whilst the other contains the air therein, and the system oscillates between the first bag full of air and the second bag empty, and the second bag full of air and the first bag empty. In fact a self oscillating condition is established as slugs of water flow through the passage in turn. The water flow may be generated by the low head in the source water and/or the kinetic energy in the source water.

It is to be mentioned that the invention can take a very large number of embodiments based on the conceptual idea of alternately increasing and decreasing the size of chambers or bags defined by flexible membrane means, and against which the water acts by gravitational effect, because of the phenomena that water above the membrane has a characteristic similar to a negative rate spring when air under pressure is applied to the underside of such membrane to deflect same upwardly, and a number of examples are given herein.

The accompanying diagrammatic drawings are referred to in order to explain the concept of the present invention and a specific embodiment thereof. In the drawings.

Figures 1A, 1B:
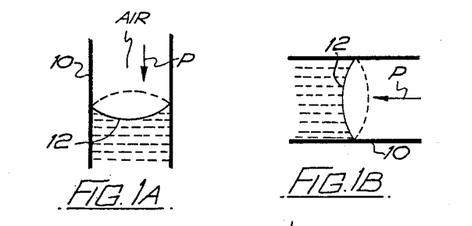
FIGS. 1A, 1B, 1C are diagrams showing how different pressure displacement curves are achieved on a membrane with air pressure at one side and water at the other side, but for different dispositions of the membrane, air and water.
Figure 1C:
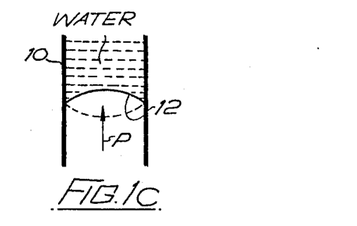
Figure 1D:
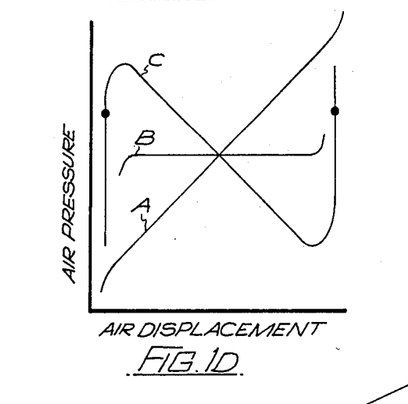
FIG. 1D is pressure displacement graph showing the pressure/displacement characteristics of the arrangements of FIGS. 1A–1C.

Referring to the drawings, and firstly to FIG. 1A, 1B and 1C in each of the figures a pipe 10 is shown and is provided with a flexible membrane 12, which may suitably be of reinforced rubber, and it acts as a robust water to air interface capable of efficient power transfer. The arrangement shown in FIG. 1A is similar to a spring with a positive spring rate in that the pressure P must increase for increased deflection of the membrane 12. The arrangement shown in FIG. 1B is similar to a spring with a zero spring rate in that pressure P does not alter with increasing displacement. In the arrangement of FIG. 1C the pressure P in fact decreases with increasing displacement of the membrane against the superposed water, making the system similar to a spring with a negative spring rate characteristic. The pressure/displacement of the systems shown in FIGS. 1A–1C characteristics are shown by A, B, C in the pressure displacement graph in FIG. 1D. It is appreciated that these characteristics apply only within the physical limits of the membrane and its attachment points.

Utilisation is made in this invention of the negative spring rate characteristic of the system of FIG. 1C, and the arrangement of FIG. 1C provides an efficient water to air energy transfer device as will be explained with reference to FIGS. 2A/2D.

Figure 2A:
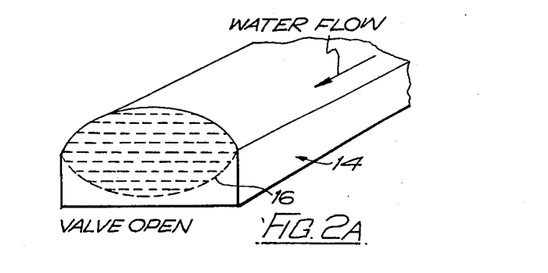
FIGS. 2A and 2B show how the membrane may be used in a duct to provide an air controlled water valve.
Figure 2B:
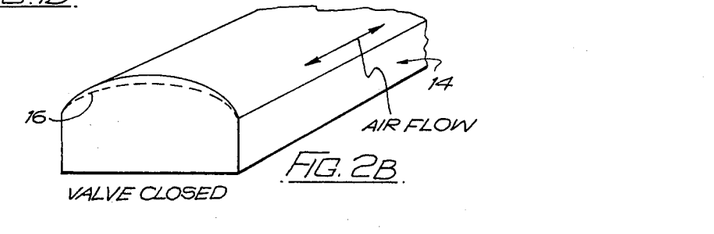

In FIGS. 2A and 2B a membrane 16 is located inside a closed duct of a shape comprising a U channel with a convex top connecting the top edges of the channel. The membrane is connected to the locations where the top meets the channel as shown in FIGS. 2A/2B.

If the channel contains air under the membrane 16, and a wave or slug of water travels along the duct between the top of the membrane and the underside of the top as shown in FIG. 2A, the water will displace the membrane 16 to the position shown in FIG. 2A as it travels along the duct and the air beneath the membrane will be displaced in either direction along the duct as shown in FIG. 2B and thus displaced air will assist in displacing the membrane at locations remote from the wave or slug of water to the position shown in FIG. 2B in which the membrane has against the underside of the top of the duct.

Figure 2C:
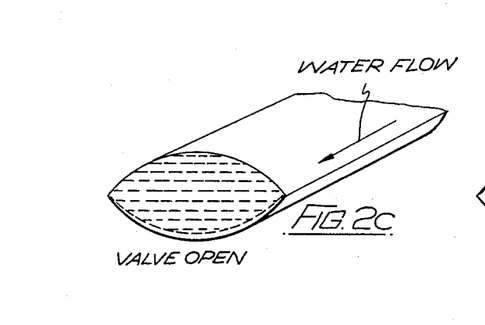
FIGS. 2C and 2D are views similar to FIGS. 2A and 2B but show how the membrane is used to form a water valve and air seal.
Figure 2D:
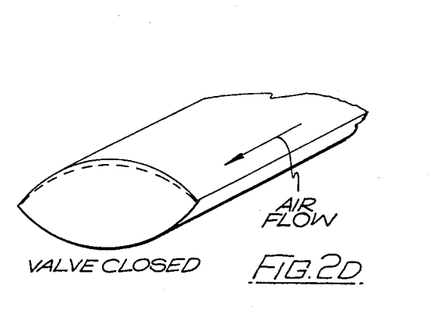

In the arrangement of FIGS. 2C/D, the duct is ellipsoid in section and the membrane can lie on the bottom or the underside of the top of the duct as shown respectively in FIGS. 2C and 2D so that as the wave or slug of water travels down the duct as shown in FIG. 1 the water and membrane also create an air valve seal so that the air is driven in one direction only along the duct, which direction is the same as the direction of the water flow and in fact the duct behaves as a peristaltic pump. The principle of operation of the arrangement of FIGS. 2A/2B leads to a family of devices producing reversing air flows, whilst the arrangement of FIGS. 2C/2D leads to a second family of devices producing unidirectional air flow.

Figure 3A:
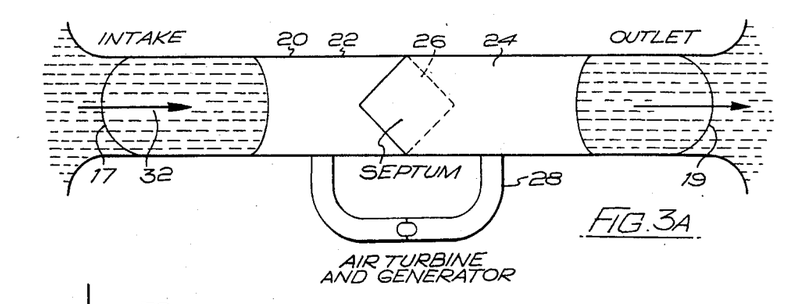
FIG. 3A is a plan view of a system according to the invention.
Figure 3B:
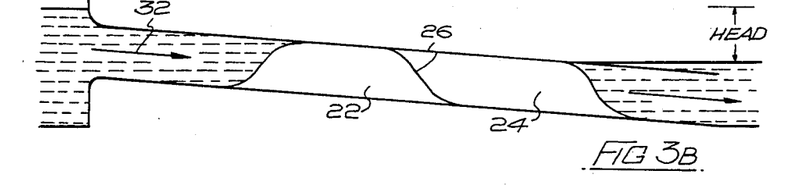
FIG. 3B is a side view of the system shown in FIG. 3A in one mode of operation.

If this membrane arrangement shown in FIGS. 2A and 2B is fitted into an inclined duct to form two air bags connected together through a bi-directional air turbine such as a Wells turbine, a self oscillating power conversion system according to one embodiment of the invention is created and such an embodiment is shown in FIGS. 3A and 3B. In FIGS. 3A and 3B an inclined duct is indicated by numeral 20, and the interiors of the two flexible air bags, forming pumping cavities, are indicated by reference numerals 22 and 24 and they are separated by a flexible septum 26 so that two independent flexible bags arranged sequentially in the length of the duct 20 are formed. The bags are held in restraint in the duct 20 in that the other ends of the bags 22, 24 are joined to the duct bottom at locations 17, 19 resectively. The bags are shown clearly in FIG. 3B. The water flow through the duct is controlled by the interchange of air between bag interiors 22 and 24, and the power contained in the low head is converted to reversing air power which in turn is converted to electrical power by a turbo-generating unit. The turbo-generating unit comprises a duct 28 connecting the bags 22 and 24 and in the duct is a Wells turbine 30 which is driven unidirectionally regardless of whether the air is flowing from bag interior 22 to bag interior 24 or vice versa. The air bags are alternately collapsed and expanded by the travelling water wave in the duct to give differential air pressure equal to half the water head available. A model test at a fifteenth scale predicts that the cycle time will be about 12 seconds for a 30 m long, 150 kilowatt rated unit giving an approximate water flow of 10 m3/s for a 2 m head. A one megawatt unit would be 60 m long for a 4 m head with a cycle time of 17 seconds. For higher rated capacities, a plurality of units can be operated in series or parallel.

It will be appreciated that the water flow indicated by arrow 32 passes sequentially over the bags and collapses same down onto the pipe base as indicated in FIG. 2A. The air which is displaced from cavity 22 passes through passage 28 and inflates the second cavity 24 as the water above that bag flows from the duct. When the travelling water passes over the first bag and arrives at the second bag it collapses the second bag returning the air to the first bag.

Figure 3C:
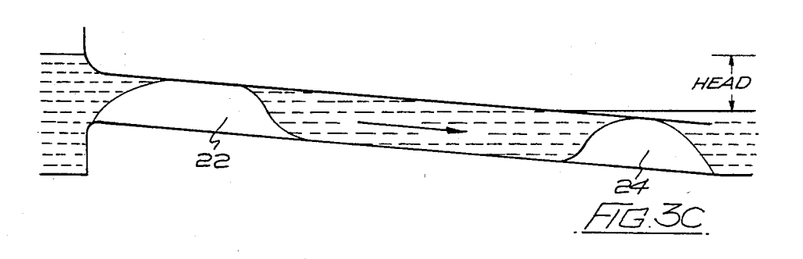
FIG. 3C is a side view of the system shown in FIG. 3B in another mode of operation.

If the air system is half full of air, that is sufficient air to fill one bag only, then a slug of water can enter and fill the top half of the duct displacing all the air from bag 22 to bag 24. When the travelling slug of water reaches bag 24 a pressure pulse will arise in the finite air volume which will trigger the bistable action at the intake to the duct where the water head is lowest. The bistable action will seal the duct intake against further water flow and allow the water slug to continue down the duct displacing the air from bag 24 to bag 22. The cycle ends when the water slug starts to leave the duct exit and the air system pressure suddenly drops triggering the bistable action at the intake to the duct allowing the next slug of water to enter. The first part of the cycle when air is displaced from bag 22 to bag 24 may be called the forward mode and the second part of the cycle when air is displaced from bag 24 to bag 22 may be called the reverse mode. The forward and reverse mode operations are shown in FIGS. 3B and 3C respectively. In FIG. 3B the air is being displaced from cavity 22 to cavity 24, whilst in FIG. 3C the air is being displaced from cavity 24 to cavity 22. FIG. 3C shows a slug of water in a position in which it flexes the central region of the membranes and the flexible septum into the bottom of the duct.

It will be apparent that the system is self-oscillating with an intermittent water flow into and out of the duct and a continuous but reversing air flow through the turbine. The water flow through the duct is controlled by the interchange of air between bags and the power contained in the available water head is converted to reversing air power which in turn is converted to electrical power by the turbo-generator unit. Examination of the pressure-flow cycle in the duct indicates a useful relationship where the differential air pressure seen by the turbine is nominally half the water head and the air flow is twice the mean water flow.

Model tests have been carried out in a laboratory flow channel with 2 m long models in order to examine the behaviour of the system and to measure power output and efficiency. The model power conversion duct, coupled to a linear air damper to simulate the characteristic of a Wells turbine, has demonstrated that the power available from the water head can be smoothly converted to air power in a simple and efficient manner. System losses appear to be dependent on the intake and exit velocity heads which can be minimised by careful design. Efficiencies of 70% for high power fast cycle times of 3 seconds and up to 96% for the low power slow cycle time of 5 seconds have been achieved for water to air power conversion.

The dimensional relationships governing the size and proportions of the power conversion duct are complex and difficult to optimise. Constraints on the design of a practical full scale unit are related to material capabilities, the action of the mechanism and the variations in heads likely to be encountered. The strength, distortion and life characteristics of the flexible membrane dictate the aspect ratio of the duct cross section. A width to depth aspect ratio of between 2 to 1 and 3 to 1 appears to be the best compromise bearing in mind the need to maximise the cross sectional area to accommodate high flow rates. The length and slope of the duct are related in that the fall in head along the duct should be approximately equal to the depth of the duct to ensure the bistable switching actions in the membrane are triggered with a minimum size of pressure pulse. A range of slopes, or depth to length ratios, of 1 in 10 to 1 in 20 ensure smooth operation without secondary modes appearing. These dimensional effects result in the design water head, depth of the duct cross section and the fall in the duct to be roughly equal. From these relationships it can be shown that the power output for a given head, H, is restricted to k H3.5 where k can vary from 5 to 20 according to practical variations in the dimensional relationships. For example, a single duct system operating with a head of 2 m could be designed for an air power rating of between 55 kW and 220 kW. Higher or lower power ratings would have to use units in parallel or series.

Figure 3D:
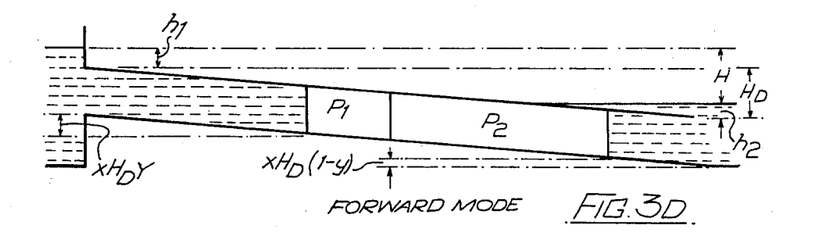
FIGS. 3D and 3E are schematic sectional elevations showing forward and reverse mode operations and relevant dimensions.
Figure 3E:
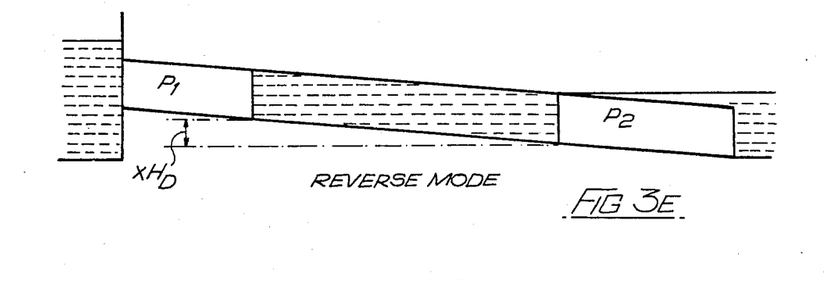

FIGS. 3D and 3E respectively show the schematic elevations of the forward and reverse modes of the single duct system. The relevant heads between water levels and duct ends are shown together with the locations of the water slug. Elementary static analysis enables simple pressure, flow and power relationships to be determined.

Figure 3F:
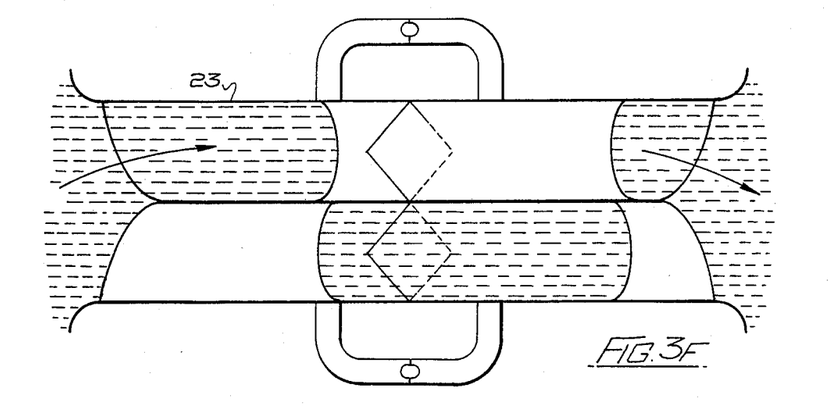
FIG. 3F is a view similar to FIG. 3A but shows a parallel duct system.

The single duct system described produces intermittent flow in the local upstream and downstream waters. Although the transitions at the duct intake and outlet are relatively smooth, due to the accommodating action of the flexible membrane, some undesirable changes in water levels take place resulting in the generation of wave reflections. These inertia effects can contribute to some energy loss and also increase the time constants associated with the switching actions between the forward and reverse operating modes, but this can to some extent be reduced by using parallel ducts as shown in FIG. 3F and described hereinafter.

The Wells self-rectifying air turbine is a low pressure, high flow machine with a high specific speed. It was invented by Dr. A. A. Wells, sometime Professor of Civil Engineering at Queens University of Belfast, for specific use in wave energy devices and up to now was need of other applications to exploit it commercially. It consists of a number of symmetrical aerofoils arranged on a rotor so that their chords are in a plane which is normal to the axis of rotation and air direction of rotation which ensures that the rotor continues to rotate in the same direction irrespective of the flow direction.

The Wells turbine operating speed is suitable for direct coupling to an alternator or induction generator running at high synchronous speeds. It presents a linear damping characteristic to the air flow and has a low loss coefficient for zero flow conditions. It is capable of self-starting and exhibits an overspeed stall characteristic. The turbine rotor is simple to manufacture and can be mounted directly on the generator shaft if required. Fixed guide vanes help to align the air flow and give a marginal improvement in efficiency.

The rating of a single stage Wells turbine is governed by its operating speed. As a rough guide the maximum power of a turbo-generator unit is $2.7 \times 109N - 2$ kW which gives 300 kW for a grid connected unit running at 3000 rev/min. Larger power grid connected machines would have to run at lower synchronous speeds or have multistage rotors.

An example of a Wells type turbine is disclosed and illustrated in Published British Patent Specification No. 2,100,810A incorporated herein by reference.

Two undesirable effects in the single duct system have been identified. These are the inertia effect due to intermittent water flow and the changes in air pressure across the turbine between the forward and reverse modes of operation when the available water head changes. Both these drawbacks can be avoided by operating two similar duct systems in parallel but out of phase with each other by 180°.

FIG. 3F shows a parallel duct system having two separate air systems each as shown in FIG. 3A. Assuming each duct 21, 23 is out of phase with the other, then the upstream and downstream water flows will be constant and the intake and outlet membrane switching will act without sudden changes in water flow. Furthermore, any assymmetric out of phase power waveforms from the turbo-generator will add together to give constant electrical power to the grid. Some minor mode-change switching transients may be present in the shaft power delivered to the generator which could be smoothed if required by adding a flywheel to an induction generator system.

The system as shown in FIGS. 3A and 3F can be used at any suitable site, and any particular site may require to have appropriate sluice gates and a turbo-generator house.

Figure 4A:
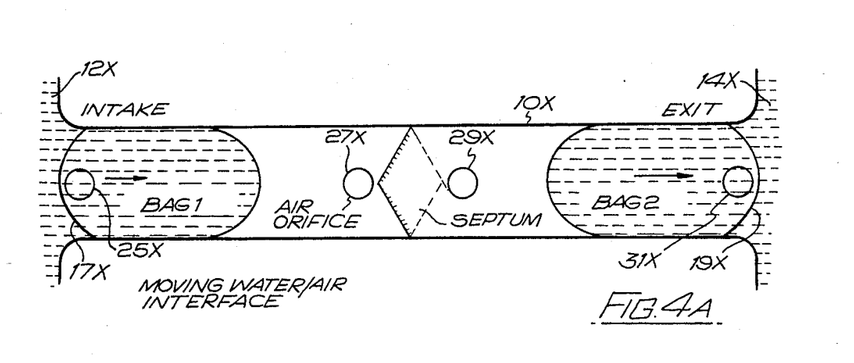
FIGS. 4A and 4B are views similar to FIGS. 3A and 3B but show a modified air system arrangement.
Figure 4B:
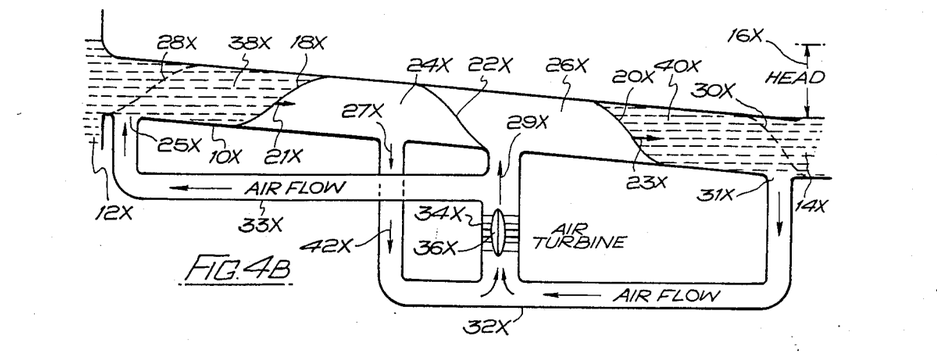

FIGS. 4A and 4B show a modified embodiment of the arrangement described in relation to FIG. 3A, and this embodiment has the additional advantages of providing uni-directional air flow which by various air ducting arrangements can provide smoother operation, and therefore smoother power flow, and more efficient turbine operation, as a conventional air turbine can be used. This is achieved essentially by providing several orifices to each cavity of the type shown in FIGS. 2C and 2D, and providing a system of ducting to direct and enhance the air flow as will now be described in more detail.

Referring to FIGS. 4A and 4B, a downwardly inclined duct 10X is arranged to receive water from a supply or source 12X so that the water will flow downwardly through the duct to a lower level indicated by reference 14X, the head between source 12X and low level 14X being indicated by reference 16X.

Inside the duct 10X are flexible membranes 18X and 20X joined by a septum 22X whereby to define two distinct air cavities or chambers 24X and 26X. In fact, at any one time, the duct will be half full of water and half full of air, the air being contained in the said chambers 24X and 26X. The dotted lines 28X and 30X show the maximum extent to which the membranes 18X and 20X can be inflated. In the condition shown in FIG. 3B, each of chambers 24X and 26X is shown as being half full of air.

There are two air orifices leading to each chamber 24X and 26X, one of which is an upper orifice, and the other of which is a lower orifice, these orifices being spaced lengthwise of the duct 10X so as to open into the cavities 24X and 26X at the upper and lower ends thereof. As regards cavity 24X, the orifices are indicated by 25X (upper) and 27X (lower), and similarly for cavity 26X the orifices are indicated by 29X (upper) and 31X (lower).

As shown in FIG. 4B, orifice 29X couples with orifice 25X by means of a direct flow passage 33X and similarly orifice 27X couples with orifice 31X by means of a direct flow passage 32X. A link passage 34X couples the passages 33X and 32X and contains an air turbine 36X which may be a conventional air turbine which will be driven by the passage of air along the link passage 36X.

Figure 5A:
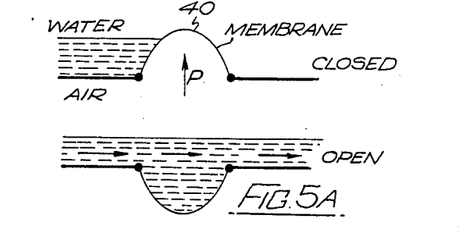
FIGS. 5A/B to 8A/B show different embodiments of the invention and the pressure displacement characteristics achieved thereby.
Figure 5B:
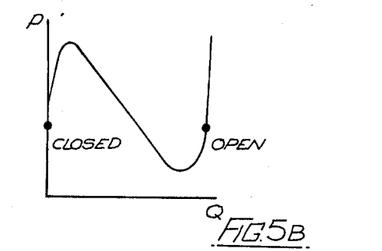

The operation of the arrangement described will now be indicated. Assume that the system is in the position shown in FIG. 3B. The slug of water 38X is travelling down the conduit 10X as indicated by the arrow 21X, due to gravitational effects, and the slug 40X is also travelling down the conduit 10X as indicated by the arrow 23X. Air is being displaced from cavity 24X through orifice 27X and flow is indicated by arrow 42X through passage 32X into the lower end of link passage 34X where it is diverted into link passage 34X and through the air turbine 36X, driving same. Air issuing from the turbine as indicated by arrows 44X enters the cavity 26X, through orifice 29X. The slug of water 38X progresses along the conduit 10X, until air orifice 25X and lifts the membrane 18X in the vicinity of that orifice, so that the slug 38X becomes isolated from the body of water 12X. The slug of water 38X continues down the duct 10X until the slug closes the orifice 29X, when air will commence being expelled through orifice 31X for the continued driving of the turbine 36X in that the expelled air passes through passage 32X to passage 34X and through the turbine 36X driving same, the exhaust air passing to the passage 33X and into cavity 24X. Thus, the turbine is alternately driven by air dispelled from one of the cavities and exhausted into the other cavity and vice versa, and in such arrangement technically it is not necessary to use a unidirectional turbine. The turbine air pressure approximates to half the water head 16X, and the air flow approximates to twice the water flow. The system is highly efficient and the only significant losses are associated with intake and exit velocity heads. FIGS. 5A/B to 8A/B show diagrammatically alternative arrangements which operate on the principle of the present invention, but in reversing air flow fashion. In FIG. 5A water flow is resisted by a membrane 40 which is inflated upwardly by air pressure indicated by the letter P. When the air pressure is released the membrane 40 falls to the open position shown, and the air displaced thereby is returned to another membrane such as membrane 40 to raise same to the closed position to prevent water flow. The switching back and forth of the air by the displacement of the membrane is used to drive a Wells turbine.

Figure 6A:
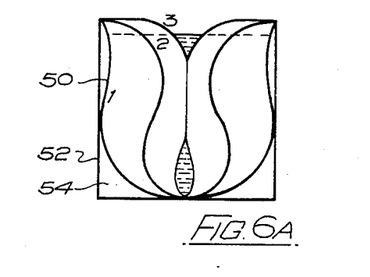
Figure 6B:
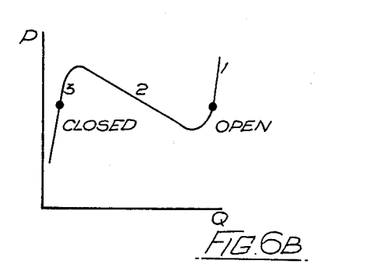
Figure 7A:
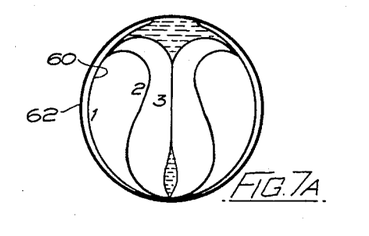
Figure 7B:
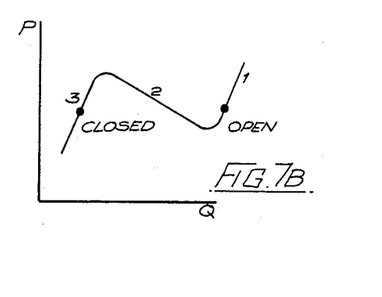

In the arrangement of FIG. 6A, a membrane 50 is located in a channel 52 and the air is to the outside of the membrane 50 in the space 54. The three positions (1, 2, 3) shown in FIG. 6A indicate respectively the position where the membrane or bag contains the maximum amount of water, and an intermediate amount of water, and the minimum amount of water, as the air pressure in space 54 is increased. The air pressure increase is by virtue of another unit operating anti-phase to the unit shown in FIG. 6A wherein the other membrane 50 is proceeding to the maximum water content position and is displacing air from its chamber 54 to the chamber shown in FIG. 6A. In the arrangement shown in FIG. 6A, the surface of the water is open to the atmosphere, whereas in the arrangement shown in FIG. 7A, which is essentially the same as that shown in FIG. 6A, the membrane 60 is contained in closed pipe 62, similar to FIGS. 2A/2B and therefore can operate at much higher pressures.

Figure 8A:
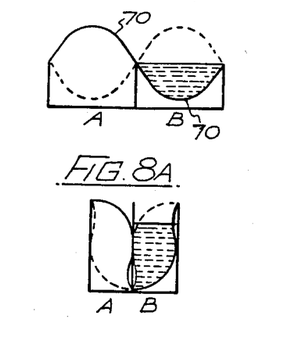
Figure 8B:
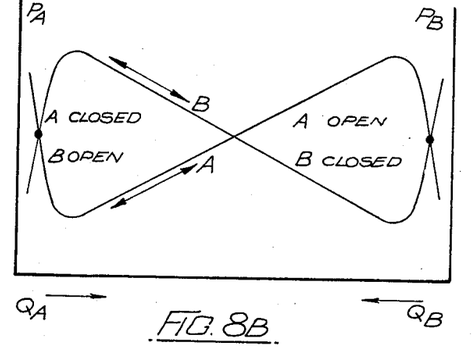

In the arrangement shown in FIG. 8A, two side by side channels A and B each with a flexible membrane 70 are shown, and in this arrangement the air displaced from the underside of the membrane 70 in one channel A or B is delivered to the underside of the membrane in channel A, again via a suitable duct containing a unidirectional turbine.

Figure 9:
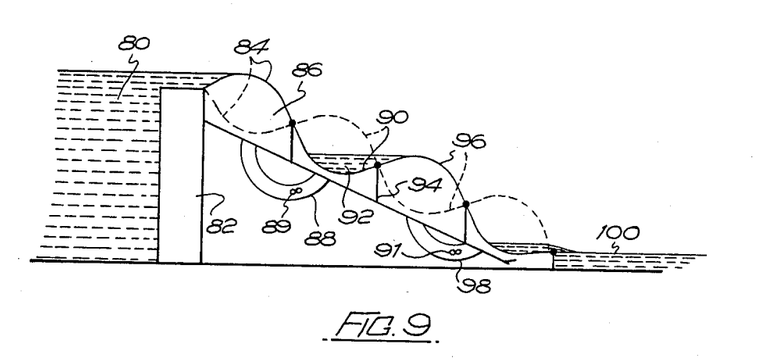
FIG. 9 shows a system according to the invention involving a weir arrangement.

FIG. 9 shows a weir type arrangement which also operates on reversing air flow in which low head water at 80 flows over a weir 82 over a first flexible membrane 84 to the underside of which is air contained in a chamber 86. As the water deflects the membrane 84 to the position shown in dotted lines, so the air in chamber 86 is displaced through passage 88 containing a turbine 89 to the underside of a second membrane 90, which is displaced to the dotted line position shown. The displacement of the air through passage 88 and the expanding of the membrane 90 causes the water previously held by the membrane as shown at 92 to flow over a sub-weir 94 and to a succeeding membrane 96 which is deflected to the dotted line position shown, which in turn drives air from the underside of the membrane through a further passage 98 containing a unidirectional turbine 91, and so on until the water eventually reaches the low level 100. During its passage to the low level 100, the energy in the head of water is absorbed in the air flow and is converted into electrical energy by the uni-directional turbines and associated generator means.

Figure 10:
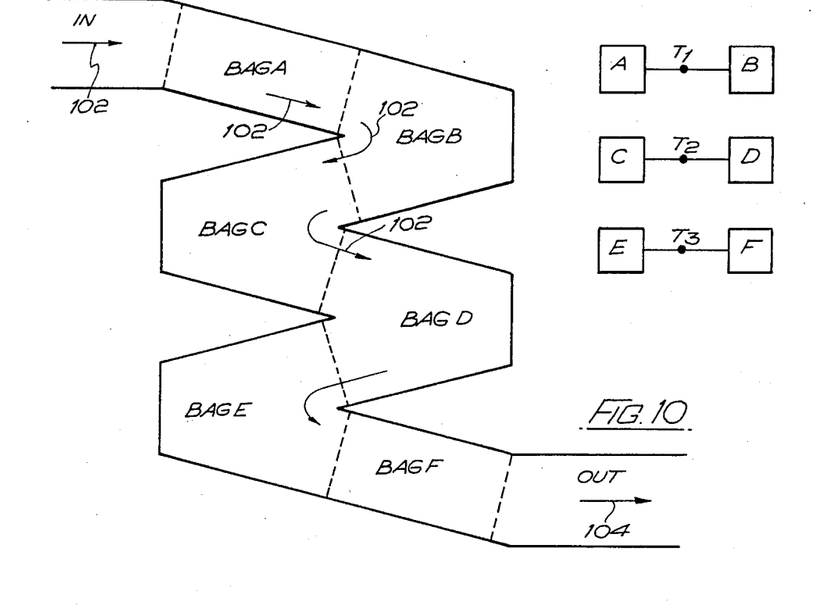
FIG. 10 shows another system according to the present invention.

FIG. 10 shows an arrangement which is somewhat similar to FIG. 9 except that the various membranes described respectively bag A, bag B, bag C, and so on are arranged in zig zag formation, but again the water flows over the bags in sequence as indicated by arrows 102 and flows out at the lower level 104 after having passed over the membranes A to F in turn. FIG. 10 also shows how the respective bags may be coupled pneumatically with turbines T1, T2 and T3 in coupling passages.

Figure 11:
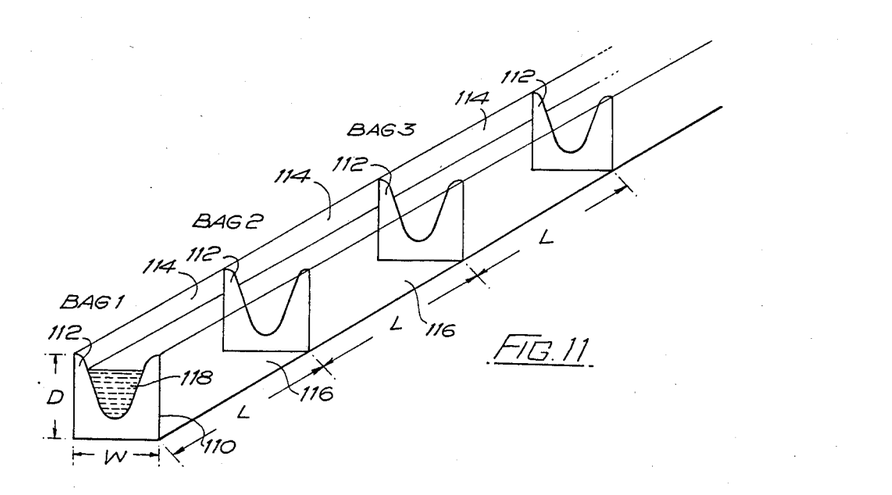
FIG. 11 shows in perspective elevation another arrangement according to the invention.

FIG. 11 shows another embodiment of the invention in perspective elevation. This embodiment is in fact constructed to operate in the principle of the embodiment as shown in FIG. 6A, and comprises a channel 110 having partitions 112 and between which extend flexible membranes or a flexible membrane 114 so as to define under each membrane an air chamber 116. Water flows down the flexible membrane 114 as illustrated by reference 118, but as each portion of water flows over the flexible membrane between a pair of weirs, the membrane expands to displace the air from the underside of the membrane, and the air passes through a passage (not shown) leading it to the underside of the next downstream air chamber 116, and in that chamber the increase in air pressure to the underside of the membrane causes the membrane in fact to collapse or be squeezed to a flattened condition, whereby water in that membrane is forced downstream into the membrane extending between the next pair of partitions 112.

Figure 12:
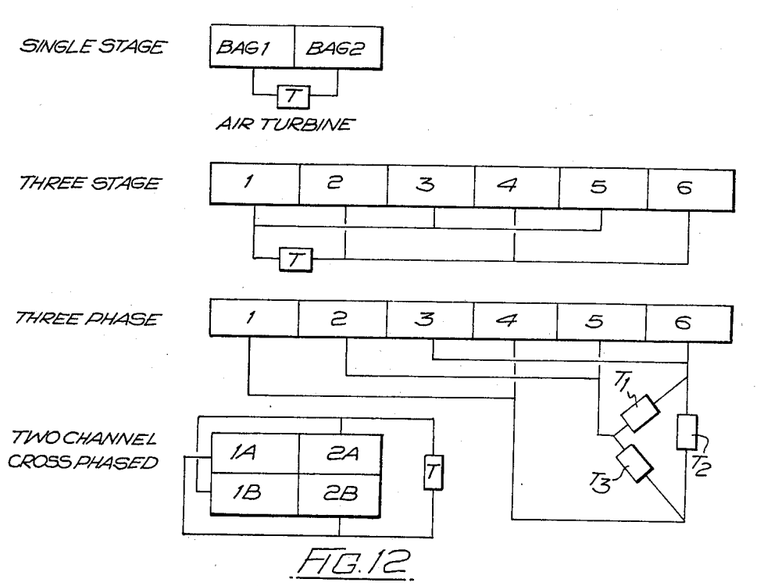
FIG. 12 shows various layouts for single stage, three stage, three phase for two channel crossed phased operation of the present invention.

FIG. 12 shows how the various cavities of all embodiments may be coupled by air passages containing turbines for single stage, three stage, three phase, and two channel crossed phase operation.

In the systems described in relation to FIGS. 3A, 3F and 4A, 4B, the air in each cavity is driven by one slug of water in a peristaltic manner. In an alternative mode of operation two or more slugs of water can exist in a larger cavity at any one time and drive the air in a travelling wave motion. By providing spaced orifices for each cavity, it can be ensured that the systems can operate on a smooth power flow and turbine efficiency is improved.

The cavities can be connected in series or in parallel depending upon the demand for higher power output and/or smoother total water flow. Various air connections can be made between the units to give single or multiple phase operation or crossed phase operation. Some arrangements may require triggering mechanisms to initiate switching actions or to ensure that parallel arrangements operate in synchronisation.

Figure 13:
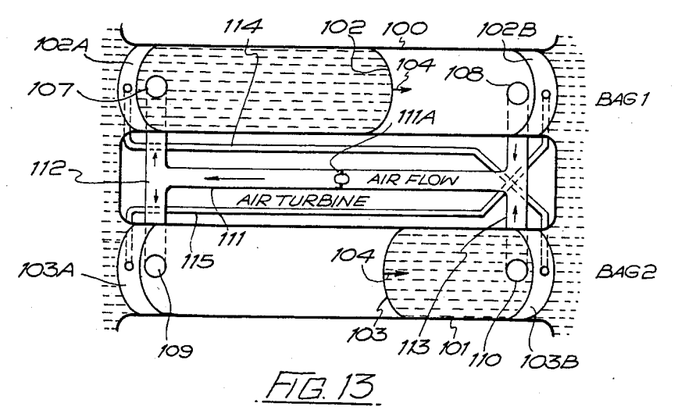
FIG. 13 shows yet another embodiment of the invention in plan view.

For example, in the arrangement of FIG. 13, two parallel ducts 100, 101 each have a single membrane 102, 103 and each is associated with trigger bags 102A, 102B and 103A, 103B which are respectively upstream and downstream of the main bags 102, 103 having regard to the direction of flow 104 of the water along the ducts 100, 101 from the inlet 105 to the outlet 106.

There are outlet/inlet ports 107, 108 and 109, 110 to the air cavities formed by the bags 102, 103, these ports being coupled to a central link passage 111 containing a turbine 111A by cross ducts 112, 113. The upstream trigger bag 102A is connected to the downstream bag 103B by trigger passage 114 and the downstream bag 102B is connected to the upstream trigger bag 103A by trigger passage 115.

The device of FIG. 13 operates as follows; In the position shown the slug of water 116 entering the duct 100 is displacing air from bag 102 through port 108, cross duct 113, link passage 111 driving turbine 111A, cross passage 112 and through port 109 into bag 103 which blocks off further flow through duct 101 until the slug of water 117 travelling out of the outlet of the duct 103 leaves the duct. When this happens, the trigger bag 103B sends a signal through the trigger passage 115 and trigger bag 102A is inflated causing the inflation of bag 102 cutting off further flow of water through duct 100, and another slug of water can enter the duct 101 whereby the air in bag 103 is driven from port 110 cross duct 113, link passage 111, driving turbine 111A, and through duct 112 and port 107.

Air reservoirs or air accumulators can be used with the uni-directional air systems described to provide energy storage or to smooth the air flow and therefore provide smoother power flow.

The material which can be used for the membrane means may be any suitable, but one specific material which will be used in a full scale test to be conducted has the following specification.

| Material | Crossply nylon cords coated with rubber |
|---|---|
| Cord diameter | 1 mm |
| No. of cords | 1000/m/ply |
| No. of plys | 2 |
| Ply orientations | 60° to duct axis |
| Material strength | 300 kN/m transverse |
| Maximum tension | 80 kN/m transverse |
| Estimated fatigue life | 5 to 10 years |

It is appreciated that many embodiments of the invention are possible, and it is believed that the invention will provide an energy conversion system capable of achieving respectable power outputs for low head and/or kinetic energy hydro stations, and initial trials would indicate that the cost of producing such power would be less than conventional hydro-electric power stations or fossil fuel fired power stations.

The systems of the present invention embody the displacement of air as a result of water flow in which a flexible membrane means acts as an interface between the water and air. The systems are dynamic insofar as the power is derived from continuously flowing water of which the flow by the use of the membrane means is broken up so as to travel in slugs or waves and these interact with the flexible membranes to give back and forth air displacements between cavities or chambers at least partly defined by the membranes so that the system is self oscillating.

The systems are best suited to applications where low head water is available such as in rivers but the invention may be applicable in other areas where other energy in liquid forms are used to drive the systems. Such other energy forms include tidal, wave and kinetic energy forms.

In the embodiments illustrated, the membrane means define two or more distinct chambers or cavities. In alternative constructions a single membrane may cooperate with the duct in which it is located so that, in conjunction with the water slugs, two cavities are defined, one at one end of the membrane and the other at the other end, when the slug of water lies between such ends and seals the membrane to the bottom of the duct as shown in FIG. 2C.

Also, the main embodiments show that in each duct there are more than one cavity defined in the duct, and the travelling slugs of water pass over and collapse the cavities in turn, but it is also within the scope of this invention that two cavities may be formed in respective parallel ducts.

General advantages of the systems of invention are that they can be easily replicated, scaled or adapted. Adjustment, such as adjustment of retention of any membrane can be effected easily. The systems are available for power sources for remote locations such as farms, and communities. The systems can be developed quickly for utilisation of power sources in third world countries who are unable to finance full scale hydro-electric generating and electricity distribution systems. The systems can be used in tidal barrages.

I claim:

1. A method for the conversion of energy in liquids, comprising the steps of:
   causing liquid to travel in a duct over a flexible membrane means;
   displacing a gaseous medium under the membrane means as said liquid travels thereover;
   driving a prime mover by the displacement of said gaseous medium;
   returning the gaseous medium under said membrane means to re-inflate the membrane means so as to temporarily block continued flow of the liquid along the duct;

thereafter allowing the liquid to displace the gaseous medium under the membrane means; and cylically repeating the above steps;

whereby the membrane means is cylically inflated and deflated and the liquid flow along the duct is broken into slugs so that the systems is self oscillating.

2. Apparatus for the conversion of energy in liquid, comprising:
   (a) means defining a first location;
   (b) means defining a second location;
   (c) conduit means connecting said first and second locations and along which liquid can flow;
   (d) flexible membrane means held in restraint in said conduit means so that liquid flowing in the conduit means passes over said membrane means;
   (e) two gaseous medium cavities defined by said flexible membrane means and over which the liquid flows in sequence in flowing along said conduit means;
   (f) gaseous medium in at least one of said cavities; and
   (g) gas flow path means connecting said cavities enabling gaseous medium to flow between the cavities as the liquid flows over the cavities and by gravity acts to displace said flexible membrane means to collapse said cavities.

3. Apparatus according to claim 2, wherein the liquid flow path means comprises a conduit containing the flexible membrane means.

4. Apparatus according to claim 3, wherein the two cavities are defined by the flexible membrane means and a common septum membrane.

5. Apparatus according to claim 3 or 4, wherein the gas flow path means comprises a passage containing a bidirectional gaseous medium turbine known as a Wells turbine.

6. Apparatus according to claim 3, wherein each cavity has an inlet and an outlet being respectively an upstream inlet and a downstream outlet, and said gas flow passage means comprise an upstream passage connecting the upstream inlets of the cavities and a downstream passage connecting the downstream outlets of the cavities and a link passage between the upstream and downstream passages, which link passage contains a gaseous medium uni-directional turbine.

7. Apparatus according to claim 5, wherein the conduit is an open top conduit, and the membrane means comprise flexible membranes connected to the top edges of the conduit, the conduit wall and the underside of the flexible membranes forming said cavities.

8. Apparatus according to claim 3, wherein there are a plurality of said cavities of which alternate ones in the sequence of the flow of the liquid are connected in pairs by said gas flow path means.

9. Apparatus according to claim 8, wherein each cavity is defined by a membrane extending between two weir edges of different heights, and over which the liquid flows.

10. Apparatus according to claim 9, wherein the sequence of weirs define a serpentine or ladder configuration.

11. Apparatus according to claim 2, wherein the liquid flow path means comprises two conduits arranged in parallel, with means defining trigger cavities at the upstream and downstream locations relative to the aforesaid cavities in the conduit so that the cavities in the respective conduits are connected but are triggered for operation in an anti-phase manner.

12. Apparatus according to claim 3, wherein the membrane means is formed from a flexible reinforced rubber.

13. Apparatus for the conversion of energy in flowing liquid comprising:
   (a) duct means along which the liquid flows;
   (b) flexible membrane means in the duct means and over which the liquid flows;
   (c) said flexible membrane means co-operating with the duct means to form at least first and second cavity means containing gaseous medium and arranged so that the liquid flows over same in sequence;
   (d) passage means coupling the first and second cavity means;
   (e) gaseous medium driven energy conversion means in said passage means whereby passage of said liquid over said membrane means causes gaseous medium initially to be displaced from said first cavity means into said second cavity means until a pressure is reached which causes flow of the gaseous medium back to the first cavity through said passage means whereby the liquid is caused to flow along the duct means in slugs, the gaseous medium flowing back and forth between the first and second cavities repeatedly whereby in use the system is self oscillating.

14. Apparatus according to claim 13, wherein said duct means is a closed duct means arranged at an inclination so that the liquid will flow from the higher end to the lower end.

15. Apparatus according to claim 14, wherein two separate cavities are defined in said duct by said membrane means said cavities being an upstream cavity and a downstream cavity.

16. Apparatus according to claim 14, wherein the duct means comprises two parallel ducts, having a common inlet and a common outlet, each duct containing membrane means defining first and second cavities which are upstream and downstream cavities, and the cavities in each duct are connected by their own passage means containing gaseous medium energy conversion means.

17. Apparatus according to claim 13, wherein said passage means connecting said first and second cavities comprises an inlet and an outlet being respectively an upstream inlet and a downstream inlet, and the upstream inlets and downstream inlets of the respective cavities are connected by upstream and downstream passages, and there is a link passage between the upstream and downstream passages, which link passage contains a gaseous medium driven energy conversion means.

18. a method for the conversion of energy in a flowing liquid, comprising the steps of:

causing the flowing liquid to pass over flexible membrane means;

displacing said flexible membrane means as said liquid passes thereover so that a fluid at an opposite side of said flexible membrane means is displaced;

using the displacement of said fluid at said opposite side to drive a prime mover from which energy which is more readily usable than the flowing liquid can be extracted;

the improvement residing in the steps of:

causing the liquid to flow in sequence over first and second portions of said flexible membrane means;

delivering the fluid at the opposite side of said first portion, in response to liquid flow thereover, to said second portion to inflate said second portion and to retard the flow of the liquid over said second portion until said first portion is displaced to a predetermined extent;

using pressure in the retarded liquid to displace said second portion;

causing the fluid displaced from said second portion to inflate said first portion to retard the flow of liquid over said first portion until said second portion has been displaced to a predetermined extent;

using the pressure in the retarded liquid to displace said first portion, and so on so that the flow of liquid causes the fluid to be driven back and forth between the membrane portions.

* * * * *